(12) United States Patent
Sakai et al.

(10) Patent No.: US 7,592,574 B2
(45) Date of Patent: Sep. 22, 2009

(54) LIGHT SOURCE CONTROL APPARATUS, IMAGE READING APPARATUS, IMAGE FORMING APPARATUS, MEDIUM STORING LIGHT SOURCE PART CONTROL PROGRAM, AND METHOD FOR CONTROLLING OF LIGHT SOURCE PART BY ADJUSTING LIGHT QUANTITY RATIOS

(75) Inventors: Norikazu Sakai, Ebina (JP); Mitsuo Shimizu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/806,825

(22) Filed: Jun. 4, 2007

(65) Prior Publication Data

US 2008/0111055 A1     May 15, 2008

(30) Foreign Application Priority Data

Nov. 15, 2006    (JP) .............................. 2006-309119

(51) Int. Cl.
    *G01J 1/32*       (2006.01)
(52) U.S. Cl. ......................... 250/205; 358/475; 358/518
(58) Field of Classification Search ................. 250/205, 250/208.1, 552, 559.11, 559.15; 358/509, 358/512, 518, 468, 474, 475, 505.52
See application file for complete search history.

(56) References Cited

U.S. PATENT DOCUMENTS

| | | | |
|---|---|---|---|
| 6,407,830 B1 * | 6/2002 | Keithley et al. | ............. 358/514 |
| 2006/0255243 A1 * | 11/2006 | Kobayashi et al. | ....... 250/208.1 |
| 2007/0262233 A1 * | 11/2007 | Shimokawa | ................. 250/205 |
| 2007/0291331 A1 * | 12/2007 | Sekizawa et al. | ............ 358/509 |

FOREIGN PATENT DOCUMENTS

| | | |
|---|---|---|
| JP | A 2000-324309 | 11/2000 |
| JP | A 2002-111974 | 4/2002 |
| JP | A 2002-237922 | 8/2002 |
| JP | A 2005-084741 | 3/2005 |

* cited by examiner

*Primary Examiner*—Thanh X Luu
*Assistant Examiner*—Francis M Legasse, Jr.
(74) *Attorney, Agent, or Firm*—Oliff & Berridge, PLC (57) ABSTRACT

A light source control apparatus that includes a light quantity detection unit that respectively detects light quantities of three colors of light emitted from a light source part. A light quantity ratio calculation unit that then calculates light quantity ratios of reflection light detected by the light quantity detection unit. When the light quantity detection unit detects light quantities of respective reference of the lights emitted from the light source part, a determination unit determines whether or not the light quantity ratios calculated by the light quantity ratio calculation unit are within a predetermined range. Responsive to the determination of the determining unit, a light quantity ratio adjustment unit adjusts the light quantity ratios of the lights emitted from the light source part on the basis of the light quantity of green-colored reflection light emitted from the light source part.

9 Claims, 8 Drawing Sheets

LIGHT SOURCE CONTROL APPARATUS, IMAGE READING APPARATUS, IMAGE FORMING APPARATUS, MEDIUM STORING LIGHT SOURCE PART CONTROL PROGRAM, AND METHOD FOR CONTROLLING OF LIGHT SOURCE PART BY ADJUSTING LIGHT QUANTITY RATIOS

CROSS-REFERENCE TO RELATED APPLICATIONS

This application is based on and claims priority under 35 USC 119 from Japanese Patent Application No. 2006-309119 filed Nov. 15, 2006.

BACKGROUND

Technical Field

The present invention relates to a light source control apparatus, an image reading apparatus, an image forming apparatus, a medium storing a light source part control program, and a method for controlling of light source part.

SUMMARY

According to an aspect of the invention, there is provided a light source control apparatus including a light quantity detection unit that respectively detects light quantities of reflection light of three color light corresponding to color light three primary colors emitted from a light source part, a light quantity ratio calculation unit that calculates light quantity ratios of reflection light detected by the light quantity detection unit, a determination unit that, when the light quantity detection unit detects light quantities of respective reference reflection light of the three color light emitted from the light source part, determines whether or not the light quantity ratios calculated by the light quantity ratio calculation unit are within a predetermined range, and a light quantity ratio adjustment unit that respectively adjusts the light quantity ratios of the three color light emitted from the light source part on the basis of the light quantity of the reference reflection light of light corresponding to green emitted from the light source part, in correspondence with the result of determination by the determination unit.

BRIEF DESCRIPTION OF THE DRAWINGS

An exemplary embodiment of the present invention will be described in detail based on the following figures, wherein.

DETAILED DESCRIPTION

Next, an exemplary embodiment of the present invention will be described based on the drawings.

Figure 1:
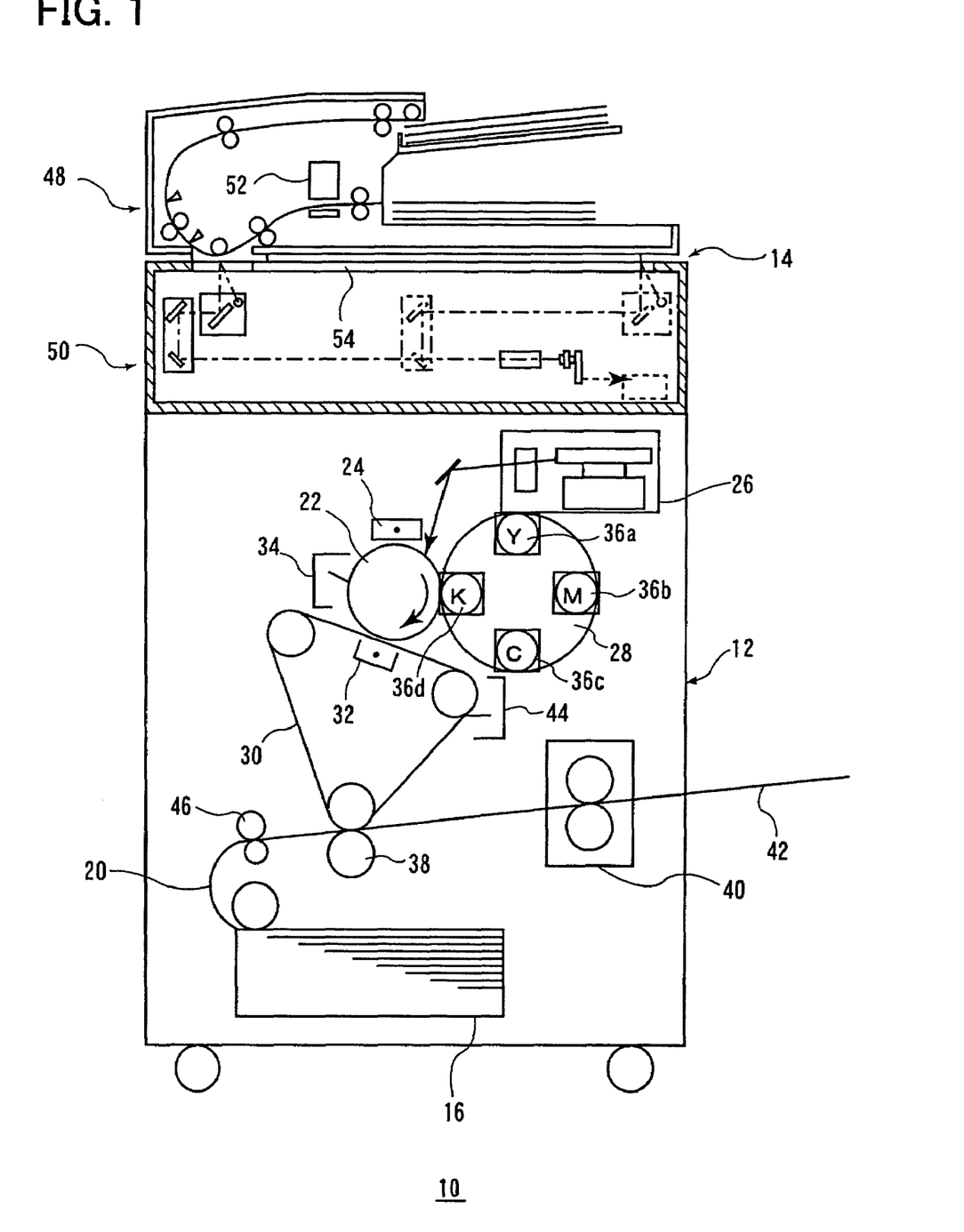
FIG. 1 is a cross-sectional view showing the structure of an image forming apparatus according to an exemplary embodiment of the present invention.

FIG. 1 shows the structure of an image forming apparatus 10. The image forming apparatus 10 is e.g. a color image forming apparatus having an image forming part 12 and an original reader 14. The image forming part 12 is e.g. a xerography type unit having a paper feed tray 16 on which sheets such as paper are stacked. An image is formed on a sheet supplied onto a sheet conveyance path 20 from the paper feed tray 16.

That is, the image forming part 12 has an image holder 22 having a photoreceptor, a charger 24 to uniformly charge the image holder 22, an exposure device 26 to form a latent image on the image holder 22 uniformly charged by the charger 24, a developing device 28 to visualize the latent image on the image holder 22 formed by the exposure device 26 with toner, a first transfer device 32 to transfer the toner image formed by the developing device 28 onto an intermediate transfer belt 30, and an image holder cleaner 34 to remove toner remaining on the image holder 22. The exposure device 26, which is e.g. a laser scanning type unit, converts an image of an original, read by a first photoelectric conversion device 62 and a second photoelectric conversion device 156 to be described later in the original reader 14, into a laser on-off signal and outputs the signal. The developing device 28 is e.g. a rotary type unit, around which Y (yellow), M (magenta), C (cyan) and K (black) color developers 36a, 36b, 36c and 36d are provided. The developing device 28 rotates such that upon development of each color, the corresponding color developer becomes opposite to the image holder 22. The first transfer device 32 having e.g. a corotron transfer unit transfers four color toner images onto the intermediate transfer belt 30. The toner images transferred onto the intermediate transfer belt 30 are transferred onto a sheet by a second transfer device 38. Then the sheet is sent to a fixing device 40, and the fixing device 40 fixes the toner image onto the sheet. The sheet on which the toner image has been fixed is discharged onto a discharge tray 42. Toner remaining on the intermediate transfer belt 30 is scraped off by an intermediate transfer belt cleaner 44.

Registration rollers 46 are provided on the sheet conveyance path 20. The registration rollers 46 are controlled to temporarily stop a supplied sheet, and feed the sheet to the second transfer device 38 in synchronization with timing of formation of toner image on the intermediate transfer belt 30.

Further, the image forming part 12 forms a monochrome (achromatic) or color (chromatic) image in predetermined gray levels on a sheet in correspondence with settings inputted via a user interface (UI) device 120 to be described later.

The original reader 14 has e.g. an automatic document feeder 48 and a reduction optical system 50 to read an image formed on the surface (first plane) of an original. Further, the automatic document feeder 48 includes a close contact type image sensor (CIS) 52 to read an image formed on the rear surface (second plane) of the original. That is, the original reader 14 has a function of skimming through the surface of the original fed by the automatic document feeder 48, a function of reading the surface of the original placed on a platen glass 54, and a function of reading the both surfaces (the first and second planes) of the original fed by the automatic document feeder 48.

Figure 2:
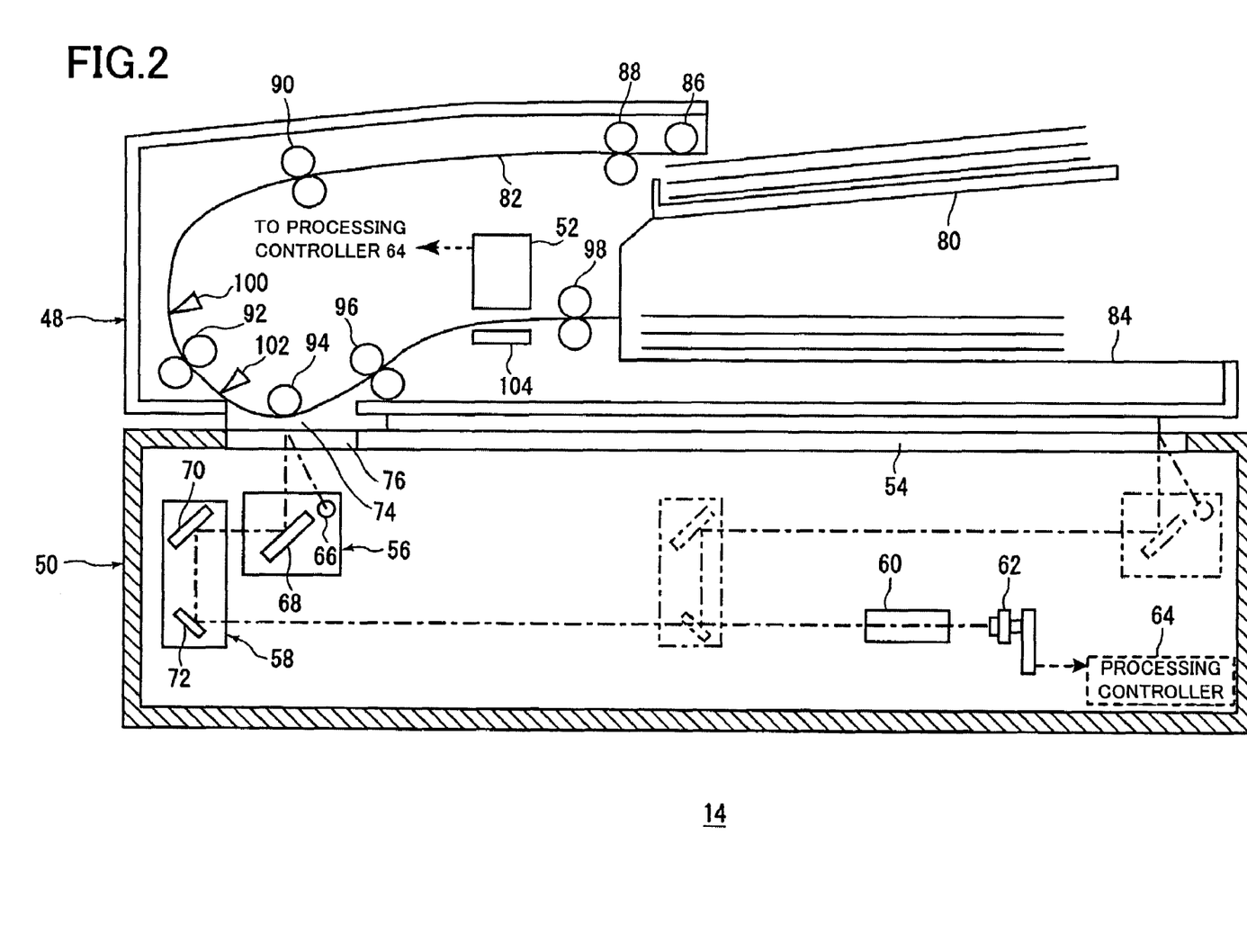
FIG. 2 is a cross-sectional view showing the structure of an original reader according to the exemplary embodiment of the present invention.

FIG. 2 is a cross-sectional view showing the structure of the original reader 14.

The reduction optical system 50 has a full-rate carriage 56, a half-rate carriage 58, a lens 60, a photoelectric conversion device 62 and a processing controller 64. The full-rate carriage 56 having a first light source 66 and a first mirror 68 makes full-stroke movement, with an original slow-scanning direction (in FIG. 2, from the left side to the right side) as a scanning direction (slow-scanning direction), in the scanning direction in the original reader 14.

The first light source 66 is e.g. a halogen lamp or a xenon lamp which extends in an original fast-scanning direction, having a characteristic (spectral distribution) in which energy for about 545 nm wavelength is the maximum, and energy for about 485 nm wavelength, energy for about 585 nm wavelength and energy for about 620 nm wavelength become higher than energy for other wavelengths. The half-rate carriage 58 having a second mirror 70 and a third mirror 72 makes half-stroke movement in the slow-scanning direction in the original reader 14.

The lens 60 is used for receiving reflection light, via the first mirror 68, the second mirror 70 and the third mirror 72, from light emitted from the first light source 66 via a CVT glass 76 onto an original placed on the platen glass 54 provided above a moving range of the full-rate carriage 56 and the half-rate carriage 58 or an original passing through a conveyed original reading position 74, and for image formation with the received light.

The photoelectric conversion device 62 is e.g. a three line color CCD having photodiodes with e.g. RGB filters (primary color filters), which receives the reflection light in an image forming position by the lens 60, and outputs analog electric signals corresponding to respective R (red), G (green) and B (blue) light quantities in pixel units using the photodiodes to the processing controller 64.

The processing controller 64 processes the electric signals inputted from the photoelectric conversion device 62 as image data, and controls the respective constituent elements of the original reader 14. Note that the processing controller 64 may be provided, with a controller (not shown) to control the respective constituent elements of the image forming part 12, inside the image forming part 12.

Further, a reference white board (not shown) to reflect light emitted from the first light source 66 is provided around the conveyed original reading position 74, and the photoelectric conversion device 62 receives reflection light of the light emitted from the first light source 66 toward the reference white board via the first mirror 68, the second mirror 70, the third mirror 72 and the lens 60.

When the original reader 14 reads an image of the surface of an original placed on the platen glass 54, the full-rate carriage 56 and the half-rate carriage 58 respectively move in the scanning direction while the first light source 66 emits light toward the original, thereby the photoelectric conversion device 62 sequentially receives reflection light corresponding to the entire surface of the original.

The automatic document feeder 48 has an original plate 80 on which a large number of originals are placed, an original conveyance path 82 to convey the originals, and a discharge plate 84 on which the originals after image reading are discharged. The original conveyance path 82, having a U-shape, is provided with a nudger roller 86, feed rollers 88, pre-registration rollers 90, registration rollers 92, a platen roller 94, out rollers 96 and discharge rollers 98 constituting a conveyance device. The nudger roller 86 moves down upon original feeding, to pick up an original placed on the original plate 80. The feed rollers 88 retard originals sent from the nudger roller 86, and feed only the top original. The pre-registration rollers 90 temporarily stop the original sent from the feed rollers 88, thereby perform skew correction. The registration rollers 92 temporarily stop the original sent from the pre-registration rollers 90, waiting for reading timing. The platen roller 94 sets the original passing on the original conveyance path 82 to be opposite to the CVT glass 76. When the original is discharged, the original is discharged via the out rollers 96 and the discharge rollers 98 onto the discharge plate 84.

Further, a first sensor 100 is provided on the upstream side of the registration rollers 92 in an original conveyance direction, and a second sensor 102 is provided on the downstream side of the registration rollers 92 in the original conveyance direction. The first sensor 100 detects timing of approach of the original to the registration rollers 92, and outputs the result of detection to an automatic document feeder controller 110 to be described later. The second sensor 102 detects timing of conveyance of the original from the registration rollers 92 to the platen roller 94, and outputs the result of detection to the automatic document feeder controller 110.

Further, the above-described close contact type image sensor 52 is provided between the out rollers 96 and the discharge rollers 98, so as to read the rear surface of an original from a position above the original. A reference white board 104 is provided to be opposite to the close contact type image sensor 52 with the original conveyance path 82 therebetween. The reference white board 104 has a reflecting upward in white as a reference color for image reading surface faced. The reference white board 104 reflects light emitted from a second light source 152 to be described later of the close contact type image sensor 52 as reference reflection light to white color toward the close contact type image sensor 52.

Figure 3:
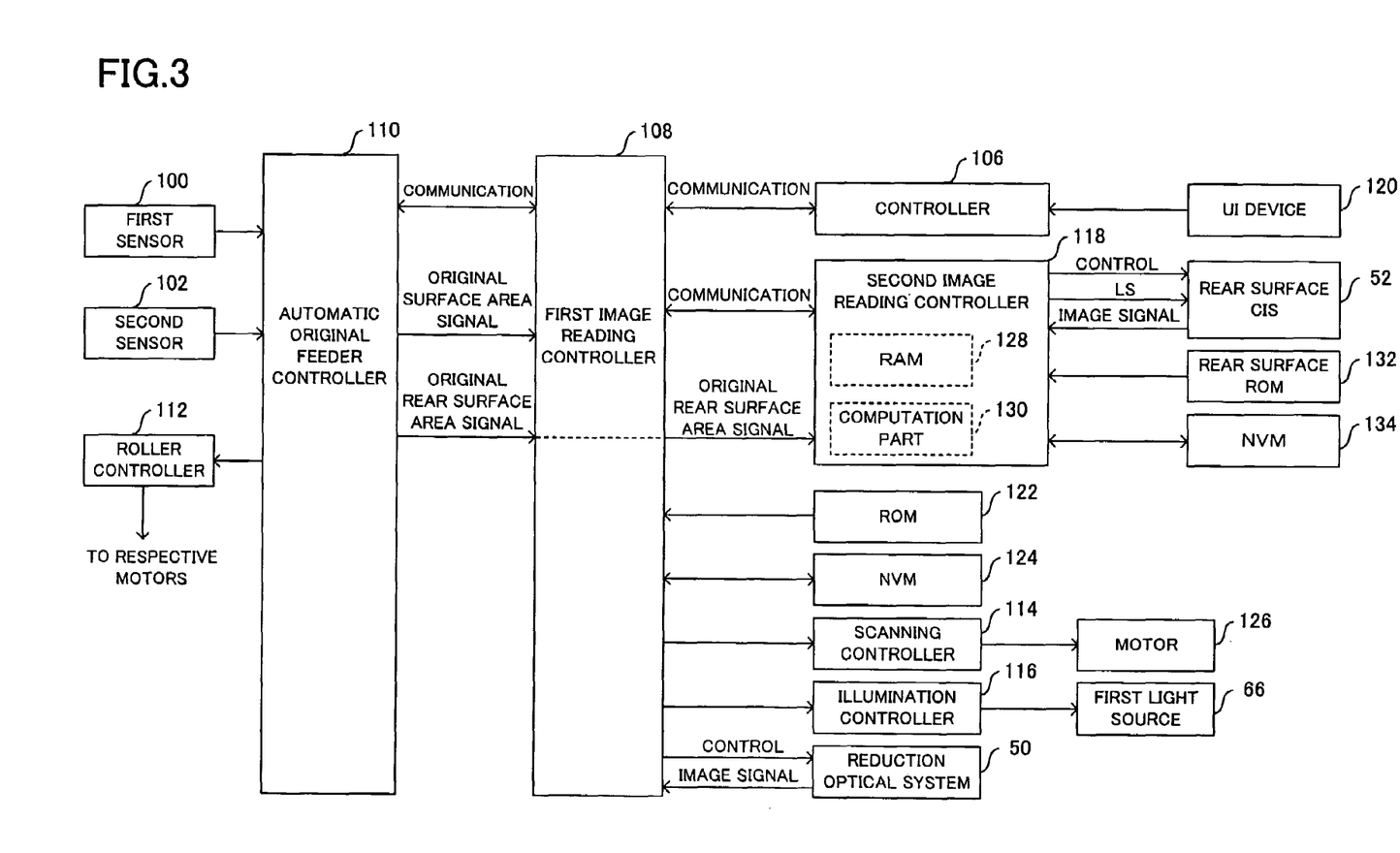
FIG. 3 is a block diagram showing the construction of the original reader.

FIG. 3 is a block diagram showing the construction of the original reader 14.

As shown in FIG. 3, the original reader 14 has a controller 106, a first image reading controller 108, the automatic document feeder controller 110, a roller controller 112, a scanning controller 114, an illumination controller 116 and a second image reading controller 118, inside e.g. the processing controller 64.

The controller 106, including a CPU (not shown), controls the respective constituent elements of the original reader 14 via the first image reading controller 108 in correspondence with settings inputted via the user interface (UI) device 120 such as a touch panel. The first image reading controller 108 operates in correspondence with the control by the controller 106, controls the reduction optical system 50 thereby obtains an image signal corresponding to an image of the surface of an original, and performs communication with the automatic document feeder controller 110 and the second image reading controller 118 for original image reading. The first image reading controller 108 including a CPU (not shown) reads a program stored in an ROM 122 and operates in accordance with the program, and stores settings to the first light source 66 of the reduction optical system 50 and the like into a NVM (Non Volatile Memory) 124. Further, the first image reading controller 108 controls the scanning controller 114 to control a motor 126 to move the full-rate carriage 56 and the half-rate carriage 58, and the illumination controller 116 to control the first light source 66 of the reduction optical system 50.

The automatic document feeder controller 110, including a CPU (not shown), performs communication with the first image reading controller 108, controls the roller controller 112 to control respective motors (not shown) to drive the feed rollers 88, the pre-registration rollers 90, the registration rollers 92, the platen roller 94, the out rollers 96 and the discharge rollers 98. Further, the automatic document feeder controller 110 receives the result of detection by the first sensor 100 and the second sensor 102, and outputs an original surface area signal indicating an area of the surface of an original (reading period) and an original rear surface area signal indicating an area of the rear surface of the original (reading period) to the first image reading controller 108.

The second image reading controller 118, including a RAM 128 and a computation part 130, performs communication with the first image reading controller 108, generates an LS (line synchronizing signal) synchronized with a clock (not shown), controls the close contact type image sensor 52 in correspondence with the original rear surface area signal received via the first image reading controller 108, thereby obtains an image signal corresponding to an image on the rear surface of the original. The RAM 128 holds image data read by the close contract type image sensor 52 from reflection light from the reference white board 104, and image data read from reflection light (black output) from the reference white board 104 as off-set when the second light source 152 to be described later is not on, by pixel. The computation part 130 has a function of calculating an average value of all the pixels by color from the image data stored in the RAM 128, and calculating a light quantity ratio to be described later using the result of calculation of tonality ranges of the respective colors.

The second image reading controller 118, including a CPU (not shown), reads a program stored in a ROM 132 and operates in accordance with the program, controls the close contact type image sensor 52 in correspondence with predetermined initial values stored in a NVM (Non Volatile Memory) 134, stores new settings for the close contact type image sensor 52 and the like into the NVM 134, thereby controls the close contact type image sensor 52.

Next, the close contact type image sensor 52 will be described.

Figure 4:
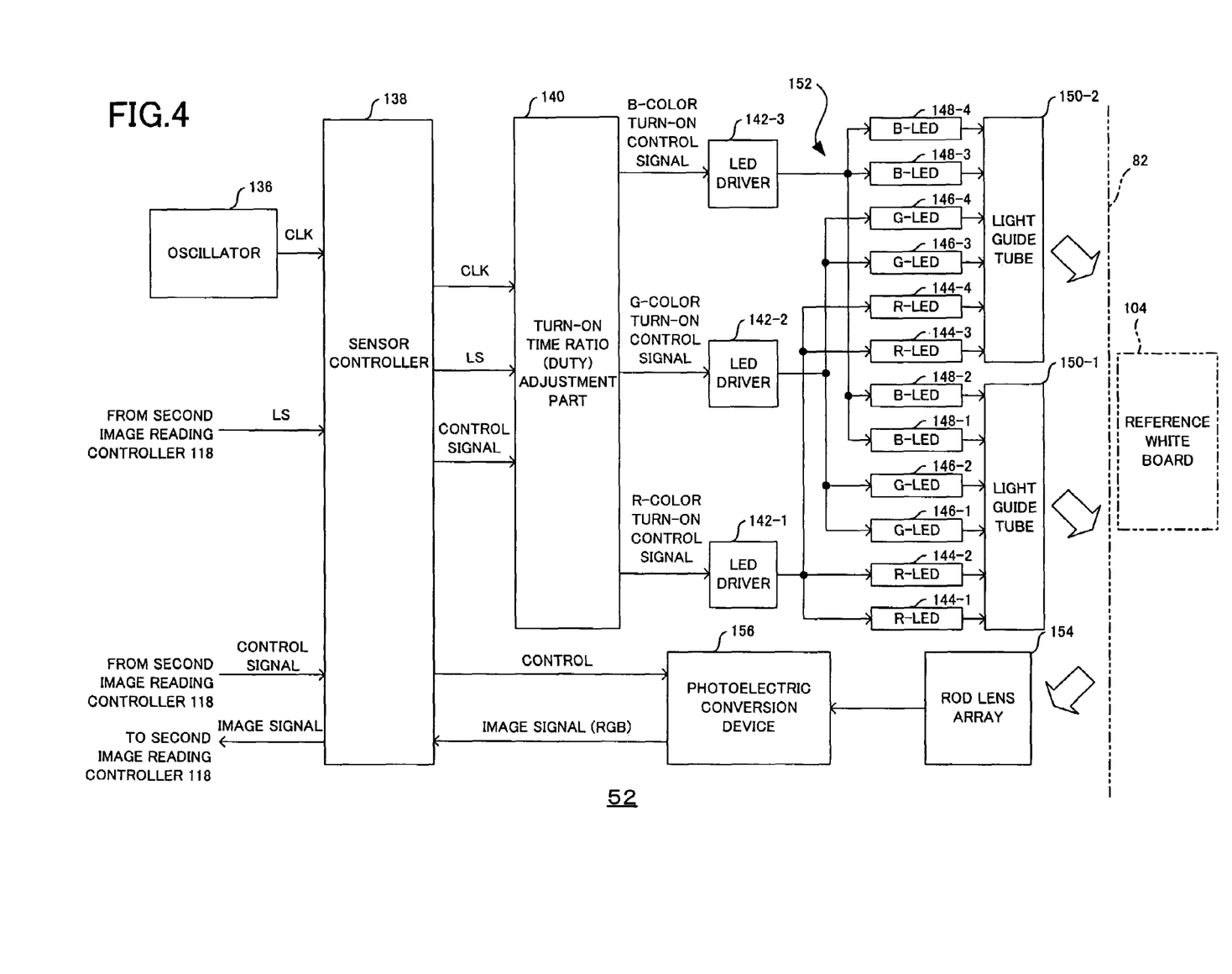
FIG. 4 is a block diagram showing the construction of a close contact type image sensor.
Figure 5:
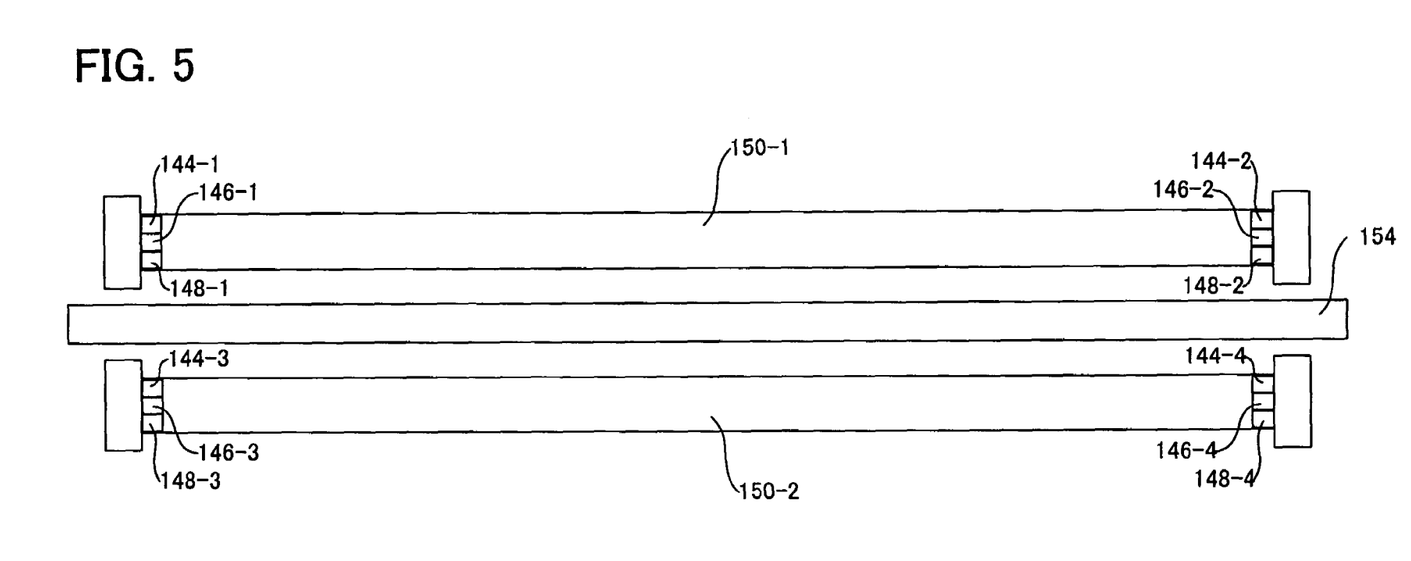
FIG. 5 is a plan view showing light guide tubes and a rod lens array, viewed from a lower position.
Figure 6:
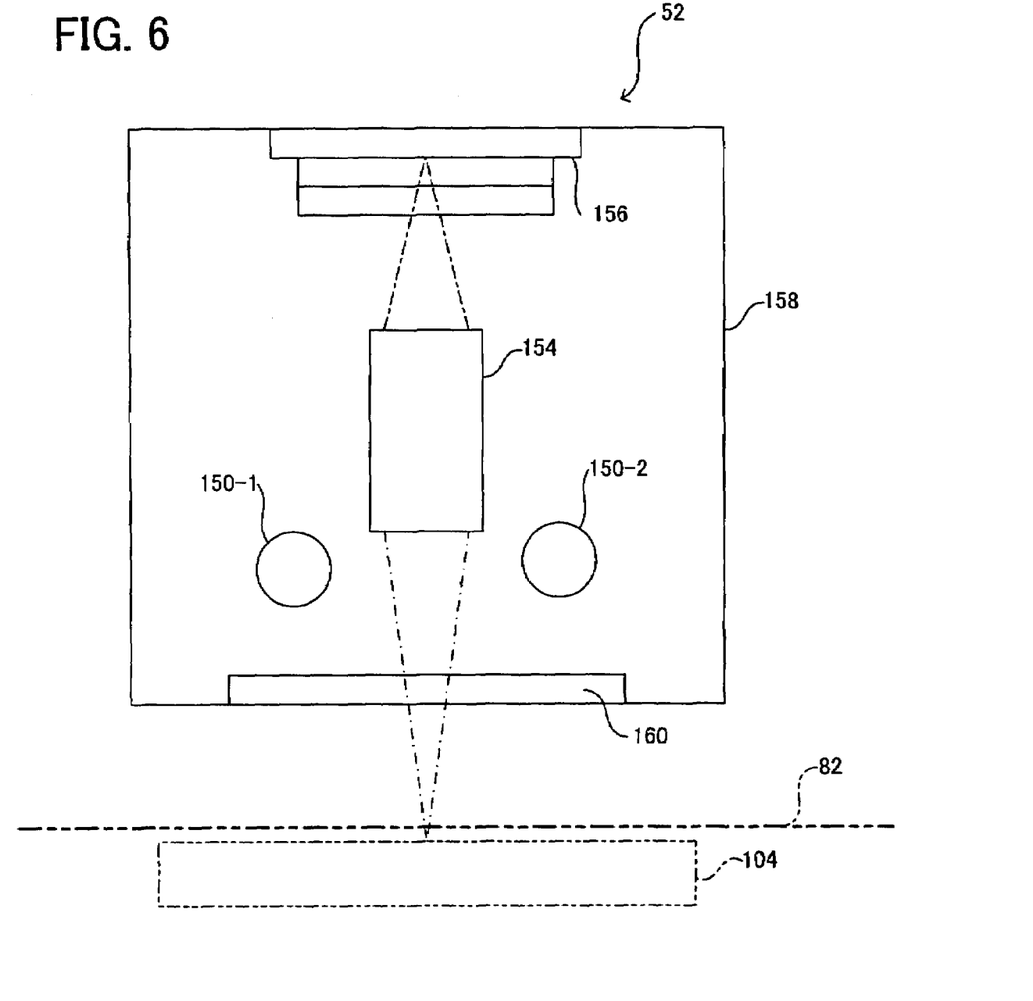
FIG. 6 is a longitudinal cross-sectional view of the close contact type image sensor.

FIGS. 4 to 6 show the structure of the close contact type image sensor 52.

The close contact type image sensor 52 has, e.g., an oscillator 136, a sensor controller 138, a turn-on time ratio (duty) adjustment part 140, LED drivers 142-1 to 142-3, red light emitting diodes (R-LEDs) 144-1 to 144-4, green light emitting diodes (G-LEDs) 146-1 to 146-4, blue light emitting diodes (B-LEDs) 148-1 to 148-4, light guide tubes 150-1 and 150-2, a rod lends array 154 and the photoelectric conversion device 156.

The oscillator 136 generates a clock (CLK) of a predetermined frequency, and outputs the clock to the sensor controller 138. The sensor controller 138 receives the clock inputted from the oscillator 136 and the line synchronizing signal (LS) inputted from the second image reading controller 118, and controls the turn-on time ratio adjustment part 140 and the photoelectric conversion device 156 in correspondence with control by the second image reading controller 118. The sensor controller 138 outputs the clock and the line synchronizing signal to the turn-on time ratio adjustment part 140. Further, the sensor controller 138, having a function of A/D converting an analog color image signal (RGB) inputted from the photoelectric conversion device 156, outputs a color image signal having a predetermined tonality value or a monochrome image signal having a predetermined tonality value to the second image reading controller 118 in correspondence with the control by the second image reading controller 118.

The turn-on time ratio adjustment part 140 receives the clock and the line synchronizing signal from the sensor controller 138, outputs an R-color turn-on control signal to turn on the red light emitting diodes 144-1 to 144-4 for a period of predetermined number of clocks to the LED driver 142-1, outputs a G-color turn-on control signal to turn on the green light emitting diodes 146-1 to 146-4 for a period of predetermined number of clocks to the LED driver 142-2, and outputs a B-color turn-on control signal to turn on the blue light emitting diodes 148-1 to 148-4 for a period of predetermined number of clocks to the LED driver 142-3, in correspondence with the control by the sensor controller 138.

Figure 7:
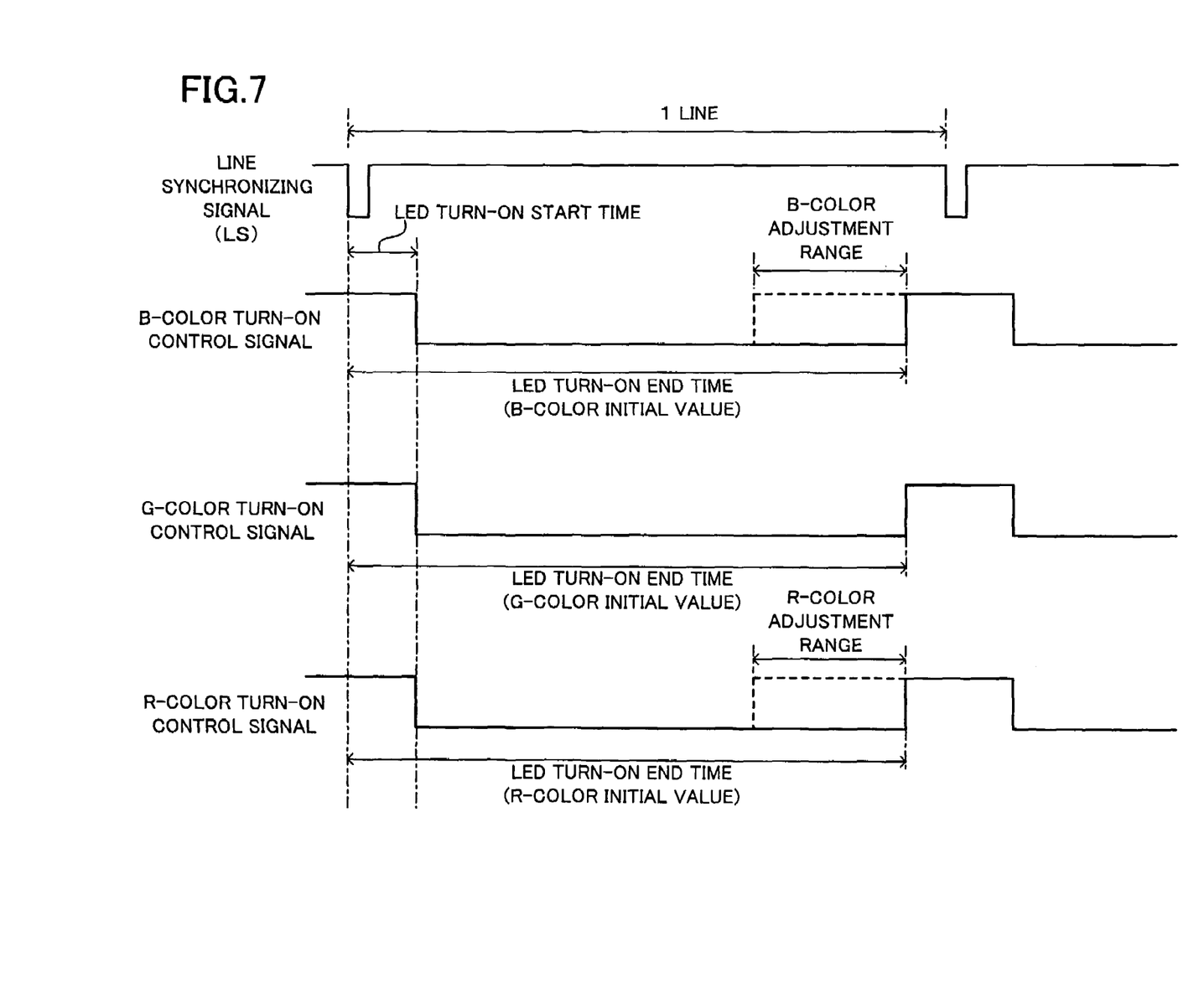
FIG. 7 is a timing chart showing the relation between an R-color turn-on control signal, a G-color turn-on control signal and a B-color turn-on control signal outputted from a turn-on time ratio adjustment part, and a line synchronizing signal.

FIG. 7 is a timing chart showing the relation between the R-color turn-on control signal, the G-color turn-on control signal and the B-color turn-on control signal outputted from the turn-on time ratio adjustment part 140, and the line synchronizing signal.

As shown in FIG. 7, the line synchronizing signal is generated so as to set the interval of trailing repeated at predetermined periods to correspond to a period of reading 1 line image. The R-color turn-on control signal, the G-color turn-on control signal and the B-color turn-on control signal are control signals to turn on the light emitting diodes (LEDs) in the L-level.

On the basis of the trailing of the line synchronizing signal, the turn-on time ratio adjustment part 140 sets the R-color turn-on control signal, the G-color turn-on control signal and the B-color turn-on control signal to the L-level after the elapse of LED turn-on start time corresponding to the predetermined number of clocks. That is, the turn-on time ratio adjustment part 140 simultaneously turns on the red light emitting diodes 144-1 to 144-4, the green light emitting diodes 146-1 to 146-4 and the blue light emitting diodes 148-1 to 148-4, on the basis of the trailing of the line synchronizing signal.

Further, the turn-on time ratio adjustment part 140 first sets the R-color turn-on control signal, the G-color turn-on control signal and the B-color turn-on control signal to the H-level after the elapse of LED turn-on end time (R-color initial value, G-color initial value and B-color initial value) corresponding to a predetermined number of clocks, on the basis of the trailing of the line synchronizing signal. Note that regarding the R-color turn-on control signal and the B-color turn-on control signal, an R-color adjustment range and a B-color adjustment range are provided to shorten the LED turn-on periods such that the light quantities of the red light emitting diodes 144-1 to 144-4 and the blue light emitting diodes 148-1 to 148-4 predetermined ratios with respect to the light quantities of the green light emitting diodes 146-1 to 146-4 are respectively in a predetermined ratio.

The turn-on time ratio adjustment part 140 respectively adjusts turn-on time of the red light emitting diodes 144-1 to 144-4 and the blue light emitting diodes 148-1 to 148-4 such that the light quantities of the red light emitting diodes 144-1 to 144-4 and the blue light emitting diodes 148-1 to 148-4 with respect to the light quantities of the green light emitting diodes 146-1 to 146-4 are respectively in a predetermined ratio (R light quantity:G light quantity:B light quantity become predetermined target values), in correspondence with the control by the sensor controller 138.

Note that the turn-on time ratio adjustment part 140 respectively adjusts the turn-on time of the red light emitting diodes 144-1 to 144-4 and the blue light emitting diodes 148-1 to 148-4 such that the spectral distribution of light obtained by combining the light emitted from the red light emitting diodes 144-1 to 144-4, the green light emitting diodes 146-1 to 146-4 and the blue light emitting diodes 148-1 to 148-4 becomes closer to the spectral distribution of the first light source 66, since the spectral distribution of the green light emitting diodes 146-1 to 146-4 has greatest influence on the spectral distribution of the first light source 66. Further, the LED turn-on start time, the LED turn-on end time (R-color initial value, G-color initial value and B-color initial color), and the respective target light quantities of the red light emitting diodes 144-1 to 144-4 and the blue light emitting diodes 148-1 to 148-4 with respect to the light quantities of the green light emitting diodes 146-1 to 146-4 (R light quantity target value with respect to G light quantity, B light quantity target value with respect to G light quantity, and respective allowable ranges of the target values) are previously stored in the NVM 134 (FIG. 3), and the result of adjustment by the turn-on time ratio adjustment part 140 is stored into the NVM 134 in correspondence with the control by the second image reading controller 118.

The LED driver 142-1 (FIG. 4) supplies a predetermined driving current to the red light emitting diodes 144-1 to 144-4 in correspondence with the R-color turn-on control signal inputted from the turn-on time ratio adjustment part 140, to turn on the red light emitting diodes 144-1 to 144-4 for a predetermined period. The LED driver 142-2 supplies a predetermined driving current to the green light emitting diodes 146-1 to 146-4 in correspondence with the G-color turn-on control signal inputted from the turn-on time ratio adjustment part 140, to turn on the green light emitting diodes 146-1 to 146-4 for a predetermined period. The LED driver 142-3 supplies a predetermined driving current to the blue light emitting diodes 148-1 to 148-4 in correspondence with the B-color turn-on control signal inputted from the turn-on time ratio adjustment part 140, to turn on the blue light emitting diodes 148-1 to 148-4 for a predetermined period.

The red light emitting diodes 144-1 to 144-4 are light emitting diodes to emit light corresponding to red among color-light three primary colors. The green light emitting diodes 146-1 to 146-4 are light emitting diodes to emit light corresponding to green among the color-light three primary colors. The blue light emitting diodes 148-1 to 144-8 are light emitting diodes to emit light corresponding to blue among the color-light three primary colors.

As shown in FIG. 5, the red light emitting diodes 144-1 and 144-2 are provided on both ends of the light guide tube 150-1, the green light emitting diodes 146-1 and 146-2 are provided on the both ends of the light guide tube 150-1, and the blue light emitting diodes 148-1 and 148-2 are provided on the both ends of the light guide tube 150-1. Further, the red light emitting diodes 144-3 and 144-4 are provided on both ends of the light guide tube 150-2, the green light emitting diodes 146-3 and 146-4 are provided on the both ends of the light guide tube 150-2, and the blue light emitting diodes 148-3 and 148-4 are provided on the both ends of the light guide tube 150-2.

The light guide tubes 150-1 and 150-2, which are arranged in parallel to the rod lens array 154, respectively uniform light emitted from the red light emitting diodes 144-1 to 144-4, the green light emitting diodes 146-1 to 146-4 and the blue light emitting diodes 148-1 to 148-4, and emit the uniformed light toward the original conveyance path 82 side.

That is, the red light emitting diodes 144-1 to 144-4, the green light emitting diodes 146-1 to 146-4, the blue light emitting diodes 148-1 to 148-4, and the light guide tubes 150-1 and 150-2 construct the second light source 152.

The rod lens array 154 is an erect same-size image forming lens array having a short optical path length, in which a large number of lens fibers are arrayed, such as a SELFOC® lens array. The rod lens array 154 forms an image with reflection light of light emitted from the second light source 152.

The photoelectric conversion device 156 is e.g. a linear CCD (color) which receives reflection light of the image formed by the rod lens array 154 via a cover glass 160 provided in a lower part of an image sensor main body 158 shown in FIG. 6, and outputs analog electric signals (image signals) corresponding to R (red), G (green) and B (blue) light quantities in pixel units, using photo diodes having RGB filters (primary color filters), to the sensor controller 138.

Next, processing by the original reader 14 to adjust (correct) the light quantities in the red light emitting diodes 144-1 to 144-4 and the blue light emitting diodes 148-1 to 148-4 will be described.

Figure 8:
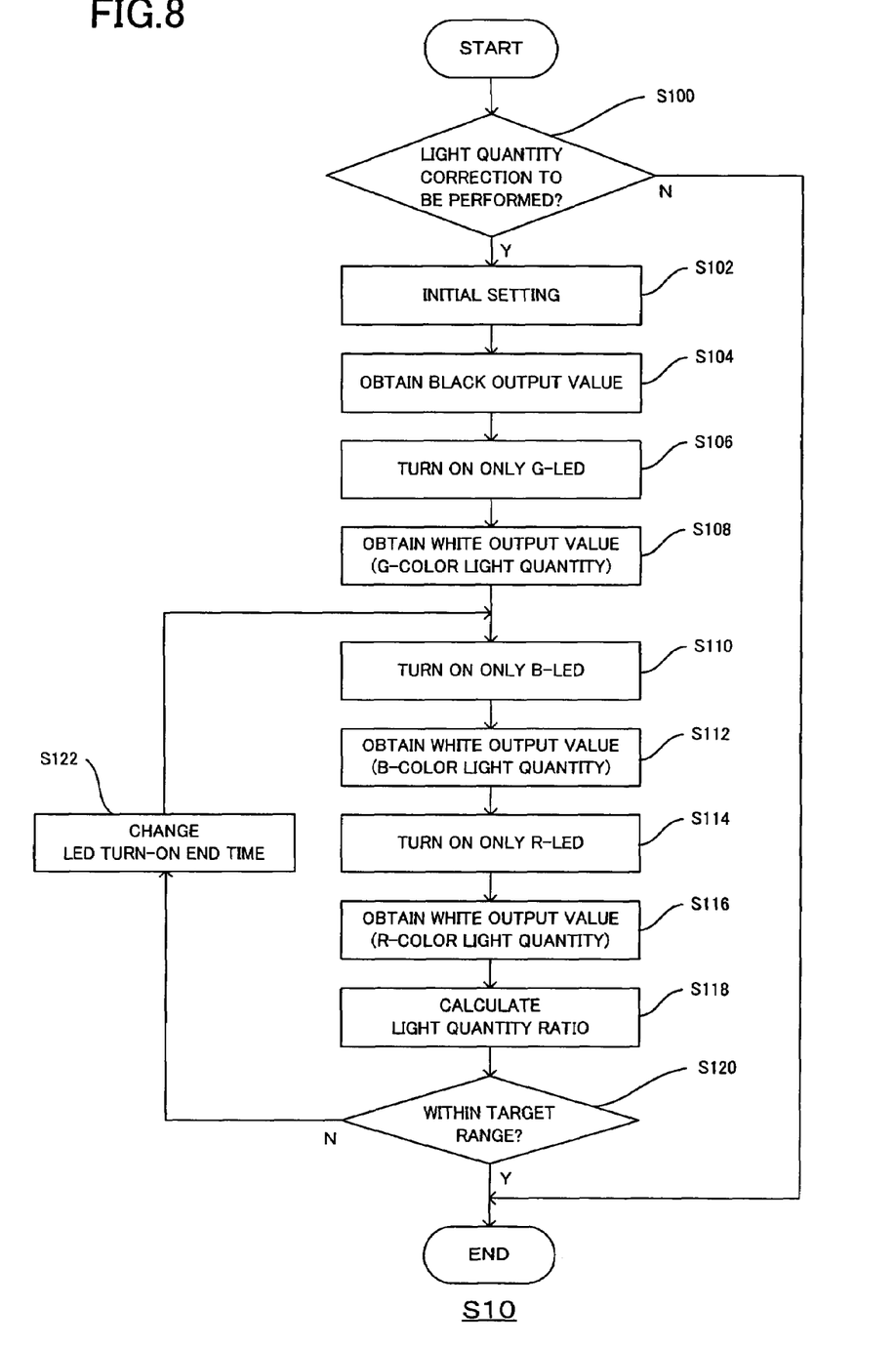
FIG. 8 is a flowchart showing processing (S10) performed by the original reader to adjust (correct) light quantities of red light emitting diodes and blue light emitting diodes.

FIG. 8 is a flowchart showing processing (S10) performed by the original reader 14 to adjust (correct) the light quantities of the red light emitting diodes 144-1 to 144-4 and the blue light emitting diodes 148-1 to 148-4.

As shown in FIG. 8, at step S100, the second image reading controller 118 determines whether or not light quantity correction is to be performed on the red light emitting diodes 144-1 to 144-4 and the blue light emitting diodes 148-1 to 148-4. When the light quantity correction is to be performed, the process proceeds to step S102, otherwise, the process ends. For example, when the power source of the image forming apparatus 10 is turned on, the second image reading controller 118 determines that the light quantity correction is to be performed on the red light emitting diodes 144-1 to 144-4 and the blue light emitting diodes 148-1 to 148-4.

At step S102, the second image reading controller 118 reads the LED turn-on start time, the LED turn-on end time (R-color initial value, G-color initial value and B-color initial value) stored in the NVM 134, and performs initial settings (setting of R-color initial value, G-color initial value and B-color initial value and the like) for the close contact type image sensor 52.

At step S104, the second image reading controller 118 obtains an image signal (black output value) read from reflection light from the reference white board 104 as offset when any of the red light emitting diodes 144-1 to 144-4, the green light emitting diodes 146-1 to 146-4 and the blue light emitting diodes 148-1 to 148-4 is not turned on, from the close contact type image sensor 52.

At step S106, the second image reading controller 118 turns on only the green light emitting diodes 146-1 to 146-4 via the sensor controller 138 and the turn-on time ratio adjustment part 140, in correspondence with the LED turn-on end time stored in the NVM 134.

At step S108, the second image reading controller 118 obtains an image signal (white output value) for G-color light quantity read from reflection light from the reference white board 104 when only the green light emitting diodes 146-1 to 146-4 are turned on, from the close contact type image sensor 52.

At step S110, the second image reading controller 118 turns on only the blue light emitting diodes 148-1 to 148-4 via the sensor controller 138 and the turn-on time ratio adjustment part 140, in correspondence with the LED turn-on end time stored in the NVM 134.

At step S112, the second image reading controller 118 obtains an image signal (white output value) for B-color light quantity read from reflection light from the reference white board 104 when only the blue light emitting diodes 148-1 to 148-4 are turned on, from the close contact type image sensor 52.

At step S114, the second image reading controller 118 turns on only the red light emitting diodes 144-1 to 144-4 via the sensor controller 138 and the turn-on time ratio adjustment part 140, in correspondence with the LED turn-on end time stored in the NVM 134.

At step S116, the second image reading controller 118 obtains an image signal (white output value) for R-color light quantity read from reflection light from the reference white board 104 when only the red light emitting diodes 144-1 to 144-4 are turned on, from the close contact type image sensor 52.

At step S118, the second image reading controller 118 calculates respective light quantity ratios of the red light emitting diodes 144-1 to 144-4 and the blue light emitting diodes 148-1 to 148-4 with respect to the green light emitting diodes 146-1 to 146-4.

At step S120, the second image reading controller 118 reads respective target light quantities for the red light emitting diodes 144-1 to 144-4 and the blue light emitting diodes 148-1 to 148-4 with respect to the light quantities of the green light emitting diodes 146-1 to 146-4 (a target value of R light quantity to the G light quantity (R/G), a target value of B light quantity to the G light quantity (B/G), and respective allowable ranges of the target values), stored in the NVM 134, and determines whether or not the R/G and B/G values are within the target ranges. When none of these values is within the target range, the process proceeds to step S122, while when all the values are within the target range, the process ends.

At step S122, the second image reading controller 118 changes the LED turn-on end time within the adjustment range for at least one of the red light emitting diodes 144-1 to 144-4 and the blue light emitting diodes 148-1 to 148-4 having light quantity determined as without the target range, and stores the result of adjustment into the NVM 134. Then the process proceeds to step S110.

When the light quantity adjustment of the red light emitting diodes 144-1 to 144-4 and the blue light emitting diodes 148-1 to 148-4 has been completed, the original reader 14 performs AGC (Automatic Gain Control) processing to set the signal level outputted from the photoelectric conversion device 156 to a predetermined level, shading processing and the like, and becomes into a stand-by status in which image reading can be performed by the light-quantity adjusted second light source 152.

Further, in the image forming apparatus 10, the R/G and the B/G target values can be selected in correspondence with settings inputted via the UI device 120, when, e.g., the original reader 14 reads an original having color images formed on both sides by the reduction optical system 50 and the close contact type image sensor 52 and the image forming part 12 forms monochrome images in predetermined gray levels. For example, the NVM 134 holds R/G and B/G target values for balanced density representation for all the R (red), G (green), B (blue), Y (yellow), M (magenta) and C (cyan), R/G and B/G target values set for accurate density representation for a particular color such as R (red) or B (blue), and the like.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A light source control apparatus comprising:
a light quantity detection unit that detects light quantities according to a result of reading out reflection light of three primary colors of light emitted onto a reference white board from a light source part, the three primary colors of light corresponding to red, green, and blue;
a light quantity ratio calculation unit that calculates light quantity ratios of the reflection light detected by the light quantity detection unit;
a determination unit that, when the light quantity detection unit detects light quantities of the three primary colors of light emitted onto the reference white board from the light source part, determines whether or not the light quantity ratios calculated by the light quantity ratio calculation unit are within a predetermined range; and
a light quantity ratio adjustment unit that adjusts the light quantity ratios of the three primary colors of light emitted onto the reference white board from the light source part on the basis of a light quantity of green-colored reflection light emitted onto the reference white board from the light source part and corresponding to a determination by the determination unit.

2. An image reading apparatus comprising:
a light source part that emits three primary colors of light, the three primary colors of light corresponding to red, green, and blue;
a light quantity detection unit that detects light quantities according to a result of reading out reflection light of the three primary colors of light emitted on a reference white board from the light source part;
a light quantity ratio calculation unit that calculates light quantity ratios of the reflection light detected by the light quantity detection unit;
a determination unit that, when the light quantity detection unit detects light quantities of the three primary colors of light emitted onto the reference white board from the light source part, determines whether or not the light quantity ratios calculated by the light quantity ratio calculation unit are within a predetermined range; and
a light quantity ratio adjustment unit that adjusts the light quantity ratios of the three primary colors of light emitted on the reference white board from the light source part on the basis of a light quantity of green-colored reflection light emitted onto the reference white board from the light source part and corresponding to a determination by the determination unit.

3. The image reading apparatus according to claim 2, wherein the light source part has at least three light emitting diodes to emit the three primary colors of light.

4. An image forming apparatus comprising:
a light source part that emits three primary colors of light, the three primary colors of light corresponding to red, green, and blue;
a light quantity detection unit that detects light quantities according to a result of reading out reflection light of the three primary colors of light emitted onto a reference white board from the light source part;
a light quantity ratio calculation unit that calculates light quantity ratios of the reflection light detected by the light quantity detection unit;
a determination unit that, when the light quantity detection unit detects light quantities of the three primary colors of light emitted onto the reference white board from the light source part, determines whether or not the light quantity ratios calculated by the light quantity ratio calculation unit are within a predetermined range;

a light quantity ratio adjustment unit that adjusts the light quantity ratios of the three primary colors of light emitted onto the reference white board from the light source part on the basis of a light quantity of green-colored reflection light emitted onto the reference white board from the light source part and corresponding to a determination by the determination unit; and an image forming part that forms an image corresponding to the detected light quantities of reflection light of the three primary colors of light and the adjusted light quantity ratios of the light quantity ratio adjustment unit.

5. The image forming apparatus according to claim 4, wherein the light source part has at least three light emitting diodes to emit the three primary colors of light.

6. The image forming apparatus according to claim 4, wherein the image forming part forms an achromatic color image in predetermined gray levels.

7. The image forming apparatus according to claim 5, wherein the image forming part forms an achromatic color image in predetermined gray levels.

8. A computer readable medium storing a program causing a computer to execute a process for controlling a light source part, the process comprising:

detecting light quantities of reflection light of three primary colors of light emitted from the light source part and reflected from a reference reflection surface of a reference white board, the three primary colors of light corresponding to red, green, and blue;

calculating light quantity ratios of the detected reflection light;

determining whether or not the calculated light quantity ratios are within a predetermined range; and adjusting the light quantity ratios of the three primary colors of light emitted from the light source part on the basis of a light quantity of green-colored reflection light emitted from the light source part and corresponding to a determination of light quantity ratios.

9. A method for controlling a light source part, the method comprising:

detecting light quantities of reflection light of three primary colors of light emitted from the light source part and reflected from a reference reflection surface of a reference white board, the three primary colors of light corresponding to red, green, and blue;

calculating light quantity ratios of the detected reflection light;

determining whether or not the calculated light quantity ratios are within a predetermined range; and adjusting the light quantity ratios of the three primary colors of light emitted from the light source part on the basis of a light quantity of green-colored reflection light emitted from the light source part and corresponding to a determination of light quantity ratios.

* * * * *